Figure 1:
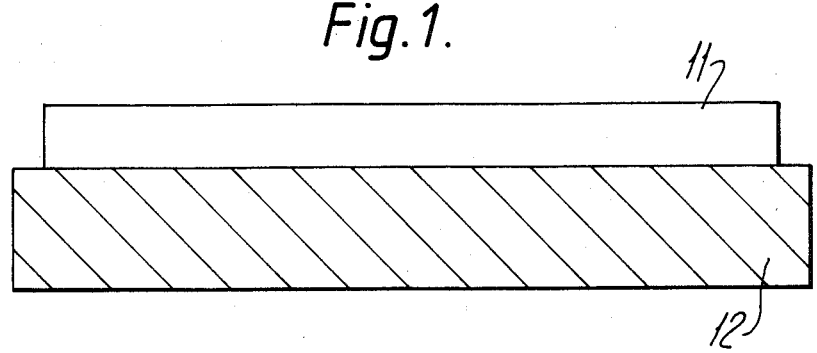

United States Patent [19]
Sterling et al.

[11] Patent Number: 4,584,074
[45] Date of Patent: Apr. 22, 1986

[54] CAPACITORS

[75] Inventors: Henley F. Sterling, Great Dunmow; Eric L. Bush, Near Harlow; John H. Alexander, Stortford, all of England

[73] Assignee: International Standard Electric Corporation, New York, N.Y.

[21] Appl. No.: 696,859

[22] Filed: Jan. 30, 1985

Related U.S. Application Data

[63] Continuation of Ser. No. 480,446, Mar. 30, 1983, abandoned.

[30] Foreign Application Priority Data

Dec. 7, 1982 [GB] United Kingdom ............... 8234823

[51] Int. Cl.⁴ .................. C25D 13/02; C25D 13/12; C25D 1/14
[52] U.S. Cl. .............. 204/181.1; 204/181.5; 204/180.6; 204/180.9; 361/321
[58] Field of Search .......... 204/181 R, 181 F, 181 T, 204/181 E, 181 N, 181.1, 181.5, 180.6, 180.9; 361/321

[56] References Cited

U.S. PATENT DOCUMENTS

| | | | |
|---|---|---|---|
| 2,556,257 | 6/1951 | Dewes | 204/181 N |
| 2,843,541 | 7/1958 | Senderoff et al. | 204/181 N |
| 3,093,911 | 6/1963 | Weisel et al. | 204/181 N |
| 3,232,856 | 2/1966 | Klach et al. | 204/181 N |
| 4,189,760 | 2/1980 | Marshall | 361/321 |
| 4,225,408 | 9/1980 | Barlow et al. | 204/181 N |

FOREIGN PATENT DOCUMENTS 4017915 2/1979 Japan .

OTHER PUBLICATIONS

Rutt, Truman, C., et al, "Fabrication of Multilayer Ceramic Capacitors by Metal Impregnation, "*IEEE Transactions on Parts, Hybrids and Packaging,* vol. PHP9, No. 3, pp. 144-147, Sep. 1973.

Powers, R. W., "The Electrophoretic Forming of Beta-Alumina Ceramic", *J. Electrochem Soc.,* vol. 122, No. 4, pp. 490-500, Apr. 1975.

*Primary Examiner*—John F. Niebling
*Assistant Examiner*—B. J. Boggs, Jr.
*Attorney, Agent, or Firm*—John T. O'Halloran; Mary C. Werner

[57] ABSTRACT

Ceramic capacitors are formed from electrodeposited ceramic dielectric layers that are provided with electrodes, stacked and fired. Contact to the electrodes is provided by each terminations and leads. As the electrodeposition process is self limiting and self heating, uniform pinhole free dielectric layers are obtained.

10 Claims, 6 Drawing Figures

CAPACITORS

This application is a continuation of application Ser. No. 480,446, filed Mar. 30, 1983, now abandoned.

This invention relates to dielectrics and in particular to those dielectrics which are based on a mixture of inorganic compounds in particulate form and which are subsequently fired to sinter them to a solid body. Those dielectrics based on ceramic materials of a crystalline perovskite structure and other dielectrics of a crystalline, amorphous or glassy structure are included in the category of dielectrics on which this invention is based. More particularly, the invention relates to the method by which these powdered dielectrics are formed into thin sections of consolidated material which, when fired with conductors, form an interleaved multilayer structure.

It is usual to employ a multilayer structure when fabricating ceramic devices, e.g. capacitors, so that layers of ceramic are interleaved with layers of metal electrode in such a way that an interdigitated two-electrode component of high capacitance value is produced. Various methods are used to make the ceramic layers as thin 'leaves', usually formed from a mix of the finely powdered ceramic material and an organic binder solvent system. For example, in a typical conventional process, a ceramic/binder/solvent mixture is coated onto a polyethylene strip, by a tape-drawing process. After drying, the ceramic/binder film is peeled off and then silk screen printed with electrodes using an ink formed from precious metal powders in an organic binder. A number of such 'leaves' are stacked and pressed together, heated to remove the binder, then fired at a high temperature. End terminations and leads may be attached following normal practice and such processes as described above are well known in the art of multilayer ceramic capacitor manufacture. In the manufacture of such components, considerable advantage may be gained by having good control over the thickness dimensions of the ceramic layer, its porosity, and the number of faults or discontinuities appearing in it. The term pinholes is used to describe such faults. Following the present industry trend to decrease dielectric thickness, these factors of thickness variation and film integrity assume greater importance. It is desirable to decrease the capacitor size for several reasons, compatibility with micro-electronic trends, economy of materials, handling of large batches of chemical mixes, etc.

From the intrinsic voltage breakdown point of view, much thinner ceramic dielectric films, and therefore much smaller capacitors, are theoretically possible, but the limitations of all the methods so far described do not allow this. In such mechanical processes the control of layer thickness and integrity are decided by such factors as the concentration and rheology of the medium, the type of substrate surface, and the coating speed.

In the past, attempts have been made to use electrochemical deposition techniques to obtain greater control over the deposition of thin dielectric layers. This is in contrast to the mechanical methods outlined above. For example H. F. Bell and J. M. Drake of IBM have suggested an electro-chemical technique based on the flocculation of acid modified polyethylene/epoxy ester for the fabrication of multiple polymer/metal layers. Pinhole free dielectric layers (13 microns) under good control are claimed. However, these dielectric films are plastic materials of low permitivity and are not formed from fired ceramic materials of high permitivity. Other workers have attempted to exploit the excellent control of film thickness and integrity by the use of another physical/electrical process, that of electrophoresis. For example, Lamb and Salmon (National Bureau of Standards, Washington DC USA) have attempted the deposition of barium titanate from a suspension of the powder in diethylene glycol dimethyl ether. A voltage of 600 was used and deposits of about 40 microns in thickness were obtained prior to firing at 1350 to 1400° C. These attempts were not entirely successful.

The object of the present invention is to overcome the disadvantages present in the methods hereinbefore described. A further object of the invention is to provide a process for the deposition of multilayer structures under controlled conditions with high layer integrity.

It is well known that excellent paint films can be formed by electropainting techniques. The technology is well described in the Handbook of Electropainting Technology by Willibald Machu (Electrochemical Publications 1978). Water soluble resin systems are available which may form the basis of an electrocoating bath.

These film forming resins contain, for example, carboxyl groups in sufficient numbers that, when neutralized by a base, typically an amine, stable aqueous dispersions are obtained. If such a dispersion is electrolyzed, a deposit of resin forms at the anode (or cathode). The presence of pigment particles stabilized in the aqueous resin system does not affect the course of the deposition; the particles migrate with the resin micelles (and generally form part of these micelles if the resin has been used as the pigment dispersant). After deposition the pigment remains on the anode as part of the destablized resin film.

We have found that similar techniques can be employed for the depostion of ceramic/binder films which will subsequently be stacked with electrodes and fired to form a multi-layer capacitor. Surprisingly, we have found that resin systems can be formulated which accept a high loading of a finely comminuted ceramic. We have also found that such resin systems provide controlled and satisfactory burn-out during the later stages of baking, firing and sintering of the body.

According to one aspect of the invention there is provided a process for fabricating a capacitor comprising a fired ceramic dielectric layer disposed between first and second electrodes, wherein said ceramic layer is formed by joint electrodeposition of a resin and a ceramic powder from a liquid medium.

According to another aspect of the invention there is provided a process for forming a film of a ceramic dielectric material, the process comprising dispersing the ceramic material as a comminuted powder in an emulsion of an organic resin suspended in a fluid, and electrodepositing the ceramic powder from the dispersion onto a conductive substrate.

We have found that high quality pinhole-free ceramic-loaded resin films are obtained by this electrodeposition process which favors the prevention of pin-holes or discontinuities in the film. For example, at the site of a bursting bubble, where the film is thinner, the region of lower resistivity attracts a higher current, to aid deposition in that area. The process is also self limiting in thickness.

The ceramic is dispersed to a finely comminuted powder in a liquid medium. To effect this dispersion each ceramic particle is coated with a resin. The ceramic and resin are codeposited in the electrodeposition process, the resin being removed during the subsequent firing process to form the ceramic dielectric. Typically the resin forms an emulsion or a colloidal solution in the liquid.

Once a particular film thickness, dependent on the applied voltage, had been deposited the deposition rate reduces very rapidly. This ensures that highly uniform and reproducible films are obtained over relatively large areas.

The comminuted ceramic chosen can be based on any type known in the art, for example, having a perovskite structure or a multi-phase structure.

Figure 5:
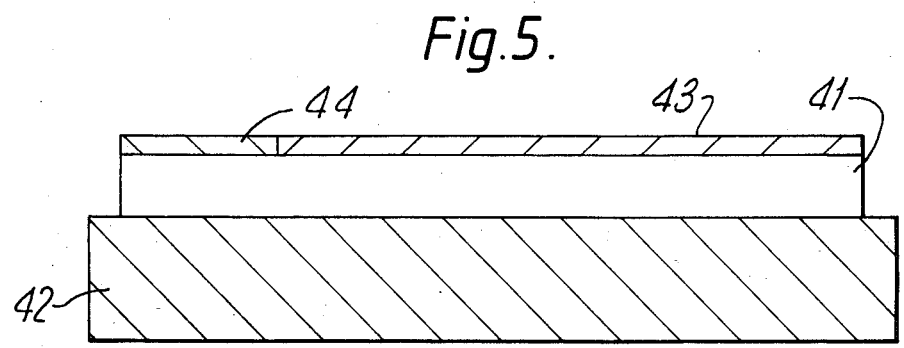
Figure 6:
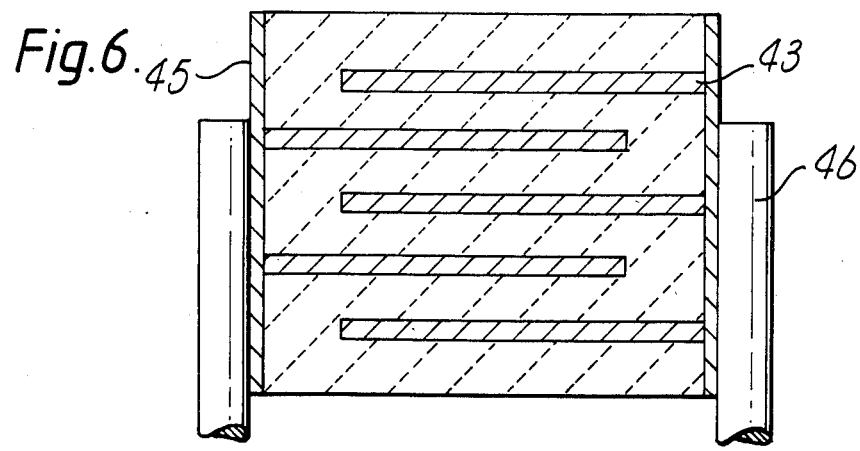

Embodiments of the invention will now be described with reference to the accompanying drawings in which FIGS. 1 to 4 illustrate in cross-sectional view successive stages in the fabrication of a ceramic capacitor, and FIGS. 5 and 6 illustrate a further capacitor fabrication sequence.

Referring to the drawings, capacitors can be formed from an unfired ceramic dielectric sheet or film 11 (FIG. 1) by joint electrodeposition from a liquid medium of a resin and the finely divided ceramic material onto a conductive substrate 12. The resin used to effect dispersion of the ceramic in the liquid medium also provides the necessary binder for the unfired deposited ceramic film. Typically we employ nickel foil, e.g. 4 to 6 microns in thickness for this purpose but other suitable substrate materials can of course be employed. The ceramic film 11 may be deposited on the substrate 12 and then separated therefrom to provide a self supporting ceramic sheet which can be subsequently processed. In order to effect this separation a suitable release agent is employed which has sufficient electrical conduction to allow deposition of the ceramic/binder electrocoating medium, but on the other hand prevents good film adherence and so allows for stripping. Such materials are known in the art and include suspensions of either colloidal graphite (AQUADAG RTM), materials such as oxygen-deficient (black) titanium dioxide or metal (e.g. aluminium) depositions on to a plastic substrate. In the subsequent firing of the capacitor any release agent remaining will either burn away completely in the case of graphite or produce a fully oxidized form of a metal which is compatible with the ceramic dielectric and benign to its electrical characteristics.

The self supporting ceramic/binder film 11 is next dried in air at a temperature of 100 to 150° C. This heat treatment serves to evaporate any volatile species which remain.

Figure 2:
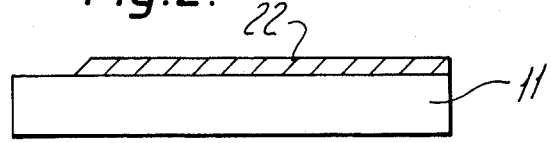
Figure 3:
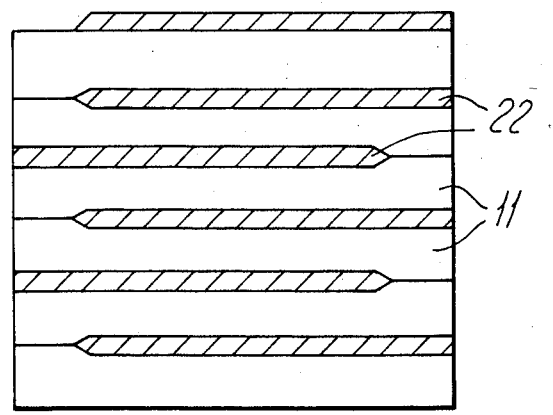
Figure 4:
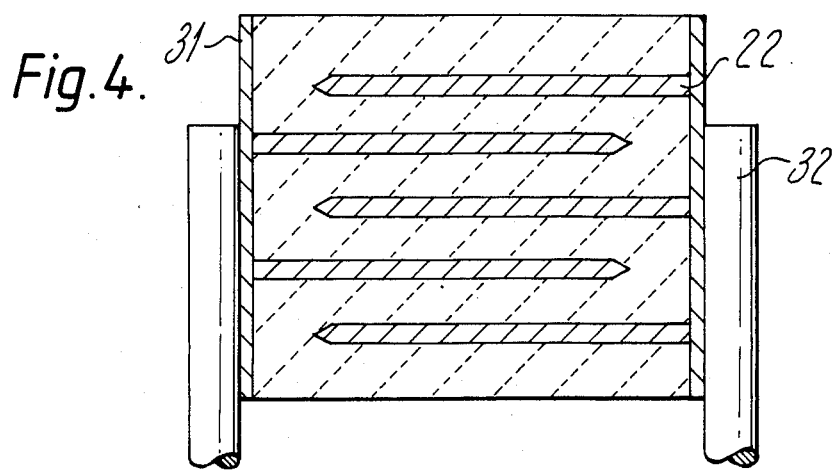

The sheet or film 11 may next be printed with a conductive ink so as to provide a pattern of conductive electrodes 22 (FIG. 2). The printed sheets are stacked (FIG. 3) and the alternate electrodes are mutually offset to form a 'stick' of unfired capacitors. The stick is then diced into individual capacitor chips which are heated typically 300 to 350° C. to remove organic materials, i.e. the resin binder, and then at a temperature of 900 to 1500° C. to form the fired ceramic multilayer chip. The firing temperature and conditions will of course depend on the particular ceramic dielectric employed, and these temperatures and conditions will be well known to those skilled in the art.

After firing has been completed, end terminations 31 (FIG. 4) are applied to provide contact to the two sets of electrodes. Contact leads 32 may then be applied to the terminations and the finished assembly may be encapsulated if required.

In an alternative embodiment (FIG. 5) a multilayer capacitor stack may be prepared by a multiple deposition process. In this technique, a layer 41 of ceramic material is electrodeposited together with the resin onto a conductive substrate foil 42. Typically the substrate may comprise a nickel foil 4 to 6 microns in thickness, but other suitable substrates, e.g. metallised plasticsfoil, can be used. The ceramic layer is then coated in selected regions, e.g. by electroless plating or screen printing, with a metal 43 that will form the permanent electrode material of the finished capacitor. Those regions left uncoated by the metal are coated with a conductive layer 44 of a second temporary electrode material which will disappear or become insulating during capacitor firing. The purpose of this temporary electrode is to allow electro-deposition of the ceramic/resin medium. This secondary electrode may be termed an evanescent electrode. Such electrodes are formed from similar materials to those already described as release agents. On top of the electrode system a second ceramic/binder layer is electrodeposited and the process is continued until a sufficient number of layers have been built up. When the assembly is diced and fired to form the ceramic chip, the evanescent electrode material is lost or rendered inactive, thus leaving two sets of permanent electrodes 43. End terminations 45 are applied to contact the two electrode arrays followed by the application of contact leads 46 and an encapsulation (not shown).

In a further embodiment of the invention the electrocoating techniques described herein may be employed in the continuous production of ceramic capacitors. Typically a continuous length of thin nickel foil (3 to 6 microns) is passed edgewise through an electrolytic coating bath containing the electrocoating medium. Immersion is not total so that a narrow margin of uncoated metal remains along one edge. After the deposition process (which coats both sides) the foil is passed through a washing bath containing de-ionized water and is then hot-air dried.

Lengths of this coated foil are placed in contact and in such a way that only the coated portions of the foil surfaces abut with the alternate layers laterally reversed to juxtapose the two exposed electrodes on opposite sides. Lengthwise the foils are co-incident but laterally they are off-set to allow electrical isolation to be preserved and to facilitate connection to be made to the opposite edges of the two juxtaposed electrodes after firing. The two foils are now rolled lightly together and jigged for heat treatment and fired in a suitable atmosphere after which axial terminations are applied to the exposed foil edges to form a finished capacitor.

In a further application an electrocoating resin/ceramic system may be formulated containing radiation sensitive materials, e.g. ultraviolet sensitive photoresists. A resin/ceramic film which is deposited on a substrate by the techniques described herein may be delineated by light, ultraviolet light, X-radiation or an electron beam, e.g. through a mask, to cross-link the photoresist in selected areas. Complete curing of the photoresist is not effected, but sufficient cross-linking takes place to enable the unexposed regions to be washed away prior to firing the remaining ceramic.

A variety of ceramic materials may be employed in the process described herein. Also there are numerous resin vehicle systems that are suitable for forming the ceramic dispersion. The following examples of compositions from which a ceramic material can be electrodeposited are quoted purely as examples and are in no way to be considered as limiting.

EXAMPLE 1

A mix was prepared of the following materials:

| | |
|---|---|
| 500 gms | ME 1420/0* |
| 100 ml | Benzyl Butyl Phthalate |
| 21 gms | Serfanol (wetting agent) |
| 20 ml | n-Butanol |
| 750 gms | Barium Titanate |
| 100 ml | Water distilled |

*An acrylic based resin medium made by Ault and Wiborg Ltd.

The mix was sand milled for 1 hour and was then added to a further 500 grams of ME 1420/0 and 650 ml distilled water.

Electrodeposition of the suspension on to a nickel substrate was effected at 10° C. and an applied voltage of +200 V. A total of 20 microns thickness was deposited in 2 minutes. The deposited material was highly uniform and free from pinholes.

EXAMPLE II

A mix was prepared by ball milling together for 17 hours:

5 grams Barium titanate based ceramic
9 grams Resydrol P411E (Cray Valley Products Ltd)
10 ml Water The mixture was removed from the mill and 75 ml de-ionized water were added.

The film anodically deposited from this composition was found to have a thickness of 20 microns after 2 minutes deposition at a voltage of 60 volts.

The film was then electroless nickel plated to a depth of 2 microns. Recoating with the ceramic medium was effected as before and the process repeated. A total of 20 layers were deposited. It was found that the deposited layers showed a high degree of uniformity and reproducibility and were free from pinholes.

These examples demonstrate the feasibility of fabricating capacitors by the techniques described herein.

A further application of the technique described herein is the fabrication of multilayer substrates from inorganic powdered materials by co-deposition electrolytically with a resin carrier; which carrier is subsequently removed by the application of heat. Furthermore, an inter-laminated electrode structure can be provided by means similar to those described above for the fabrication of capacitors. This electrode infra-structure is used to facilitate the interconnection of circuit elements through suitably placed access points as known in the arts of printed circuit manufacture and hybrid technology. A further application exploits the excellent "throwing-power" of the electrocoating process to make structures which are non-planar compared with those mentioned above. These structures may be of the open box type, tubular or castellated in form. They can be formed onto aluminized polythene for example which burns away during the subsequent bakeout and firing stages of manufacture to leave only a very thin insulating oxide film on the dielectric material.

We claim:

1. A process for fabricating a multi-layer ceramic capacitor comprising:
   electrodepositing a layer of a mixture of a ceramic powder and a resin material onto a conductive electrode to form a dielectric layer;
   performing at least twice a succession of steps to form a stack, including:
   depositing a permanent electrode material in a predetermined area on a surface of the dielectric layer said predetermined area being less than the entire surface of the dielectric layer;
   coating the remaining area on the surface with a temporary electrode material;
   electrodepositing a layer of a mixture of a ceramic powder and a resin material onto both the permanent electrode material and the temporary electrode material;
   heating the stack to convert the temporary electrode material to an insulating material, to remove the resin material and cure the ceramic dielectric layer.

2. The process as claimed in claim 1 where the heating step is performed at a first temperature in the range of 300°–350° C. to remove the resin material and at a second temperature in the range of 900°–1500° C. to cure the ceramic layers.

3. The process as claimed in claim 1 wherein the depositing step includes screen printing.

4. The process as claimed in claim 1 wherein the depositing step includes electroless plating.

5. The process as claimed in claim 1 wherein the electrodeposition step includes forming the mixture from ceramic powder with perovskite structure.

6. The process as claimed in claim 1 wherein the coating step includes depositing nickel on the dielectric layer.

7. The process as claimed in claim 1 wherein the coating step includes depositing carbon as the temporary electrode material.

8. The process as claimed in claim 1 wherein the coating step includes depositing an electrically conductive form of titanium dioxide as the temporary electrode material.

9. The process as claimed in claim 1 wherein the electrodepositing step includes forming the mixture of ceramic powder which has a multi-phase structure.

10. The process as claimed in claim 1 wherein the electrodepositing step includes forming the resin material from a radiation sensitive material.

* * * * *